United States Patent Office 3,440,188
Patented Apr. 22, 1969

3,440,188
AQUEOUS-BASED POLISH COMPRISING ETHYLENE ACRYLATE ESTER COPOLYMER AND HOMOPOLYMER OR COPOLYMER OF STYRENE AND/OR ACRYLATE ESTERS
Donald L. Burdick and Harold D. Lyons, Overland Park, Kans., assignors to Gulf Oil Corporation, Pittsburgh, Pa., a corporation of Pennsylvania
No Drawing. Filed Jan. 10, 1966, Ser. No. 519,441
Int. Cl. C09g 1/04; C08g 1/16, 1/10
U.S. Cl. 260—8
10 Claims

ABSTRACT OF THE DISCLOSURE

A water base polish is disclosed having an aqueous phase with a base polymer and a synthetic resinous polymer dispersed in it. The base polymer is an interpolymer containing 70 to 80 percent by weight ethylene, 5 to 12 percent by weight of an alkali metal acrylate or methacrylate, 5 to 10 percent by weight of acrylic or methacrylic acid, 5 to 12 percent by weight of acrylamide or methacrylamide, and 0 to 5 percent of an acrylic or methacrylic acid ester. The synthetic resinous polymer is a homopolymer or copolymer of styrene, and/or acrylic and methacrylic acid esters.

---

This invention relates to aqueous dispersions of polymeric materials, and more particularly to such aqueous dispersions for use as polish compositions.

Various polishing compositions for application to floor and wall coverings and other surfaces are known. In general, the polishes are comprised of aqueous dispersions of natural and synthetic waxes, such as polyethylene, a film-forming material such as styrene and acrylic resins, and alkali-soluble resins which function to improve the leveling and removability properties of the polishes. Various modifications in the components of these polishes have been proposed for the improvement of the polish film properties, such as gloss, waterspot resistance, resistance to powdering or dusting, slip resistance, recoatability, removability, buffability, scuff resistance and the like. However, the modifications heretofore proposed have resulted in the improvement of one property at the expense of another, particularly since a number of the properties are interrelated. For example, waterspot resistance and removability of a floor polish are interrelated, also buffability and scuff resistance are related. Attempts heretofore have necessarily suffered the disadvantage of improving one of these interrelated properties at the expense of the other.

Accordingly, it is an object of this invention to provide novel polish compositions eliminating disadvantages of the prior art.

Another object of this invention is to provide novel polish compositions from which coatings can be deposited which have enhanced performance characteristics.

A further object of this invention is to provide novel polish compositions which can be used to polish asphalt, vinyl, vinyl asbestos, linoleum, and rubber flooring tile, as well as surfaces of wood, metal, painted metal and the like.

Other objects and advantages will become more apparent from the following description set forth below, wherein all parts and percentages, unless otherwise specified, are given as parts and percentages by weight.

In accordance with this invention, it has been discovered that superior aqueous-emulsions of the self-polishing type can be obtained from a combination of components which comprise (a) alkali metal hydroxide and ammonia modified copolymers of ethylene and an acrylate ester selected from the group of methacrylic and acrylic acid esters of monohydric alcohols having from one to four carbon atoms, and (b) a synthetic resinous polymeric material which is a polymerization product of one or more monomer units in the group of styrene and the esters of acrylic and methacrylic acid, such as the acrylic and styrene resins. Comprehended in this invention are poilsh compositions comprised of the foregoing components A and B with and without a third component (C) comprised of an alkali-soluble resin more particularly described below. As will be understood, the invention also contemplates the inclusion of additives and modifiers conventional in the art, as for example, leveling agents, plasticizers, emulsifiers, self-cleaning agents, synthetic waxes such as polyethylene, and the like.

The alkali modified component A copolymers comprehended in this invention are of the type and composition disclosed in copending application U.S. Ser. No. 131,108, filed Aug. 14, 1961, wherein the copolymers treated and comprehended within this invention are copolymers of ethylene and acrylate esters selected from the group of acrylic and methacrylic acid esters of a monohydric alcohol containing from one to four carbon atoms. Specifically, the pre-modified copolymers operative within this invention will have a weight average molecular weight above 5,000 and will have chemically combined therein about 70 to about 80 weight percent ethylene units and about 20 to about 30 weight percent of the defined acrylate ester units, and preferably 72 to 76 weight percent ethylene and 24 to 28 weight percent of the ester containing groups. As disclosed in the aforesaid copending application, the alkali-modified copolymers comprehended in this invention comprise the defined ethylene-acrylate acid ester copolymers which are prepared (normally as an aqueous suspension) at about 200 to 245° C., with sufficient alkali metal hydroxide and ammonium hydroxide to convert the ester groups to (based on the original ester mole content of the copolymer) 28 to 34 mole percent alkali metal acrylate units selected from the group of alkali metal acrylate and alkali metal methacrylate units, 26 to 38 mole percent amide units selected from the group of acrylamide and methacrylamide units and 29 to 38 moles percent of acid units selected from the group of acrylic acid units and methacrylic acid units with a permissible amount of the original ester units remaining in the modified polymer, being in the range of 0 to 17 mole percent. In general, the equation for the above reaction for preparing these modified copolymers can be expressed as follows, with the ethylene and ester groups depicted as repeating units of the copolymer:

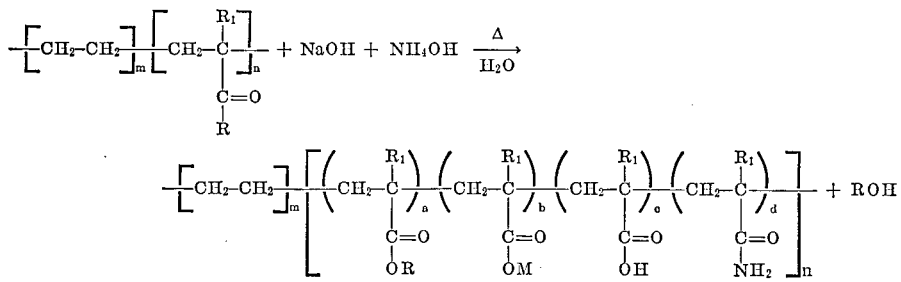

where R is the ester group moiety of a monohydric alcohol containing from one to four carbon atoms; $R_1$ is hydrogen or a methyl group; "$m$," "$n$," "$b$," "$c$" and "$d$" are positive integers, and "$a$" may be zero or a positive integer, and wherein the sum of $a$, $b$, $c$, and $d$ equals $n$; and M is an alkali metal such as sodium, potassium, and the like.

In view of the considerable detail disclosed in the aforesaid copending application U.S. No. 131,108 concerning the preparation of the alkali-modified copolymers comprehended in this invention, a recitation of all the details for such modification is not feasible and, accordingly, the teachings of this copending application are incorporated herein by reference thereto.

In general these resultant modified copolymers, comprehended in this invention, will have chemically combined therein about 70 to about 80 wt. percent ethylene units, about 5 to about 12 wt. percent of the defined alkali metal acrylate units, about 5 to about 12 wt. percent of the defined acid units, about 5 to about 12 wt. percent of the defined amide units and zero to about 5 wt. percent of the defined acrylate ester units of monohydric alcohols containing from one to four carbon atoms; and preferably from about 72 to about 76 wt. percent ethylene units, about 7.3 to 8.8 wt. percent of the defined alkali metal acrylate units, about 6.7 to about 10.2 wt. percent of the defined amide units and about 7.6 to about 9.9 wt. percent of the defined acid units and zero to 4.4 wt. percent of the defined acrylate ester units of monohydric alcohols containing from one to four carbon atoms. A particularly effective ester unit in the modified copolymers comprehended in this invention is methyl methacrylate. For purpose of convenience these alkali modified copolymers will be referred to as "base polymers,' and this term "base polymer" will be so restricted hereinafter.

A convenient manner of employing these base polymers is in the form of a solvent or water dispersion (i.e. emulsion) thereof, particularly since the alkali modification of the ethylene/acrylate ester copolymers is preferably effected while in the form of an aqueous dispersion. In such event, the emulsions (i.e. dispersion) can conveniently contain from about 1 to about 99 wt. percent of the above polymer, and preferably about 20 to about 30 percent by weight of solids. However, the base polymer content of such emulsions is not critical. In fact, the base polymer can be employed in solid form if so desired.

The styrene resins and acrylic comprehended for component B resinous materials in the polish compositions are well-known synthetic water-insoluble thermoplastic vinyl polymeric material. In general the styrene resins and acrylic resins can be prepared in the form of an emulsion or solution containing from 36 wt. percent to 50 wt. percent, and preferably 36 wt. percent to 40 wt. percent by weight of solids. However, if desired, emulsions or solutions containing higher or lower concentrations of the component B resinous materials can be employed. Also commercial styrene resins and acrylic resin formulations and emulsions can be employed, with suitable adjustment being merely made by the use of other components, dilutions with water or concentration thereof.

The styrene resins are well known synthetic water-insoluble thermoplastic materials. These styrene resins are composed or organic polymers that have a polymer structure which is predominantly composed of monomer units derived from styrene. These styrene resins may be composed of homopolymers of styrene, or copolymers or styrene with one or more other comonomers which are copolymerizable therewith by conventional polymerization techniques, such as the methacrylic acid, acrylic acid, acrylonitrile, acrylamide, itaconic acid, maleic anhydride, and methacrylic acid and acrylic acid esters of monohydric alcohols containing from one to eight carbon atoms. Also contemplated are the shellac supported styrene resins as for example shellac supported polystyrene which may be prepared by the emulsion polymerization of styrene in the presence of shellac.

The acrylic resins are also well known in the art, and are synthetic water insoluble thermoplastic vinyl polymeric materials which are composed of monomer units derived from the esters of acrylic and methacrylic acids. Typical esters of such acids which are comprehended in this invention are the methacrylic and acrylic acid esters of monohydric alcohols containing from one to eight carbon atoms, such as methyl methacrylate, ethyl methacrylate, butyl methacrylate, hexyl methacrylate, 2-ethyl hexyl methacrylate, methyl acrylate, ethyl acrylate, hexyl acrylate, 2-ethyl hexyl acrylate, and the like. These acrylates may be composed of homopolymers of such acid ester monomers, or may be composed of copolymers of one or more of such acid ester monomers with one or more other vinyl unsaturated comonomers which are copolymerizable therewith by conventional emulsion polymerization techniques. Typical of such comonomers for these acrylic resins are styrene, acrylonitrile, acrylamide, itaconic acid, acrylic acid and methacrylic acid.

Latexes containing such styrene resins and acrylic resins and methods for their preparation for use in water-based self-polishing compositions are well known, and in general the latexes are prepared of dispersed particles of the polymers which are about 0.1 micron of smaller for purposes of enhancing dry-bright characteristics of coatings laid down from the polish compositions.

The alkali-soluble materials are optional components of the polish compositions of this invention, and may be employed to provide special characteristics of leveling and removability for the polish compositions. Among the various alkali-soluble resins which may be employed as the third component are, for example, rosin, shellac, casein, phenol-formaldehyde resins, copolymers of styrene and maleic anhydride, condensation products of reactants comprising maleic anhydride and rosin and/or polyhydric compounds, or condensation products of reactants comprising fumaric acid and rosin and/or polyhydric compounds, such as resinous products of the condensation of maleic acid with the glycerol esters of the rosin acids, among others. As with the other components, the alkali-soluble resins may be prepared in the form of a solution or dispersion for admixture with the other components. In general where solutions or dispersion of the alkali-soluble material are employed, they will contain from about 10 to about 25 percent, and preferably from 12 to 18 percent by weight of solids.

The precise composition of the various components in the polish composition of this invention may be varied over relatively wide ranges in order to provide products having special desired properties and characteristics. In general, the polish compositions of this invention may be formulated to contain from about 10 to about 25 percent by weight of total solids, and preferably from 12 to 18 wt. percent solids, from which coatings may be employed. However, it is to be understood that more concentrated compositions may be prepared for convenience in shipping and storage which may be followed by subsequent dilution for use.

In the two component polish compositions of this invention it is necessary that the proportion of the base polymer (Component A) to the synthetic resinous material (Component B) be controlled within limits. In general, the proportion of these two components may range from 75 parts by weight of the Component A base polymer and 25 parts by weight of the Component B synthetic resinous material to 25 parts by weight of the Component A and 75 parts by weight of the Component B; and preferably in the range of 25 parts by weight of the Component A and 75 parts by weight of the Component B to 60 parts by weight Component A and 40 parts by weight Component B.

In the three component polish compositions the proportion of the Component A (base polymer) to Component B (synthetic resinous material) will remain in the same ranges indicated therefor above for the two component polish compositions, with the amount of the Component C (alkali-soluble material) in the polish compositions being based on the amount of Component A present in the polish compositions. In general, the Component C may be present in the polish compositions in the range of about 10 to about 90 wt. percent, based on the Component A, and preferably from about 30 to about 80 wt. percent based on the Component A.

The polish compositions of this invention can be prepared by mere blending the various components, at ambient temperatures, in any order in the proportions adapted to provide the proportions of components set out herein for the two-component and three-component polish compositions. As brought out hereinabove, in preparing the compositions of this invention, each of the basic components may conveniently be prepared or obtained in the form of an aqueous emulsion or solution, and the emulsions or solutions may then be blended in proportions such as to provide concentration of the components in final polish compositions within the ranges specified therefor above.

The polish compositions of this invention containing the basic components in the ranges set out above have outstanding characteristics. They have good spreading and leveling properties, and coating films deposited from such compositions are flexible and tough with exceptional hardness, as for example a Shore D hardness of 62. The resultant deposited films have exceptional dry-bright gloss, water spot resistance, slip resistance and recoatability properties, resistance to powdering or dusting, and outstanding heel-mark resistance. An outstanding advantage is the resistance of the polished surface to scuffing and the ease with which gloss can be restored by buffing. For purpose of determining the foregoing characteristics, various formulations of the polish compositions were subjected to standard test for such properties which are set out below.

Gloss

The polish composition is applied to a series of black vinyl asbestos tile in accordance with the directions of ASTM D 1436–56T, Method B. In sum, 1.5 mls. of the polish composition is pipetted into a folded 2 x 2 inch gauze "SteriPad" (Johnson and Johnson) held in a spring clip (Acco Products Clamp No. 125). The title is then coated with parallel and overlapping strokes, first in one direction and then in another at right angles to the first. After the polish dried, gloss is evaluated visibly as excellent, very good, good, fair, or poor.

For double coat evaluation the foregoing application of the polish is repeated, dried and a second coating of 2 mls. of the polish applied in the same manner to one-quarter of the tile. After the second coating of polish has dired, the gloss of the tile is again determined visually as above.

Recoatability

One coat of the polish compositions is applied to black vinyl asbestos tile in the same manner as for "Gloss" above. After a period of about one hour, a second coat of polish is applied to about one-quarter of the tile in one direction only, using 2 mls. of the polish. While spreading the second coat, observation is made concerning the drag of the gauze and any liftening, whitening and nonwetting of the first coat. Recoatability is rated as excellent, very good, good, fair or poor.

Waterspotting

The portions of the tile used for recoatability evaluations are used in this test. The test is made when he polish surface has aged for two hours and again after 24 hours. For purposes of this test 1 ml. of water was placed on an undisturbed area of the polish film for 15 minutes, and the water then blotted with absorbent paper. The ratings for waterspotting were then based on evidence of film removal, sensitivity to light rubbing and/or whiteness of the film. The waterspotting was then reported as none, very slight, slight, moderate or severe.

Leveling

Black vinyl asbestos tiles are laid on a level surface. A 0.15 ml. quantity of a polish composition is pipetted to the top surface of the tiles and uniformly spread over a 2 x 4 in. area using a doctor blade applicator with a clearance of 0.008 in. The polish is spread rapidly, starting at the center, by moving the applicator blade back and forth four times to produce a uniform coat over the 2 x 4 n. area; and the applicator blade is removed at the center of the area. Observations are then made as to poor leveling properties such as any tendency of the coating to puddle, draw in from the edges, ridge and any other deformation in the coating. The results are recorded as good, fair or poor.

Removability

Black vinyl asbestos tiles were coated with polish compositions in the same manner as for the leveling test above, and then aged for 25 hours at 52° C. (125° F.). The coated and aged tiles were tested with a 2% aqueous potassium soap solution which is prepared by dissolving, by weight, 3.5 parts commercial grade (90%) potassium hydroxide and 16.5 parts oleic acid in 100 parts of distilled water containing 5 parts of 28% aqueous ammonium hydroxide. The tiles were then subjected to the washing action of the soap solution in a Gardner washability machine to determine the number of brush strokes required for complete removal of the polish film. Removability is reported as follows.

Number of strokes required
for complete removal:            Removal Ease
    25 to 50 _____ Excellent.
    50 to 100 _____ Very Good.
    100 to 150 _____ Good.
    150 to 200 _____ Fair.
    >200 _____ Poor.

Haze

A series of 2½ x 6 in. black carrara glass plates are first washed with soap, rinsed and dried so that the glass surfaces are free of film and water spots. A polish composition is applied to the clean surfaces with the equipment and method described for the gloss test above with the following two exceptions: (a) the applicating strokes are made only parallel to the long dimension of the glass plates, and (b) a strip of glass along one long edge is left uncoated. The degree of haze is determined by comparing the polish film with the uncoated strip of glass; and the results are reported as none, very slight, slight, moderate or severe.

Powdering

Black asphalt tiles were placed on level surfaces, and 0.4 ml. of a polish composition are pipetted onto the tile surface, and spread on a 2 x 4 in. area in the manner prescribed for the leveling test above. The polished tiles are then aged for 24 hours at 75±2° F. and 50±2% relative humidity. The polished surfaces were then tested in Crockmeter unit, with a 670 Kelly #720 green billiard cloth. The results are then compared with standards and the results reported as none, very slight, slight, moderate or severe.

Heel-mark resistance

A series of 9 x 9 in. white vinyl asbestos tiles were flooded with a polish composition (approximately 100 mls. each) and placed in a vertical position where the tiles were allowed to dry for two hours at 270°F. and 50% R.H. A second coat of the polish was applied in the same manner with the exception that the tiles were allowed to dry in a reverse direction for 18 hours. The tiles were then tested in a Snell Accelerated Soiling Capsule instrument, and the results reported as excellent, very good, good, fair or poor heel-mark resistance.

Slip resistance

A series of 9 x 9 in. Official Test Linoleum tiles were twice flooded and dried in the same manner as specified for the heel-mark resistance test above. The tiles were then tested in a James machine conventionally employed for the measuring of the static coefficient of friction of waxed and polished floor surface, and the results recorded.

EXAMPLE I

Base Polymer A.—A base polymer A was prepared from a copolymer comprised of 74 wt. percent ethylene monomer units and 26 wt. percent methyl methacrylate units. The modification of the copolymer comprised reacting, by weight, 350 parts of the copolymer with 10 parts NaOH and 700 parts of 58 percent aq. NH$_4$OH in 900 parts water at 240° C. for five hours. The resultant product comprised a latex containing 18.4 wt. percent total solids, which was stripped by evaporation to 25.6 wt. percent total solids, and then readjusted by dilution with water to 15 wt. percent total solids. The resultant base polymer comprised a copolymer having chemically combined therein, by weight, 74 percent ethylene, 7.4 percent sodium methacrylate, 9.4 percent methacrylic acid, 9.1 percent methacrylamide and 0.1 percent methyl methacrylate.

Synthetic resinous polymeric component A

A synthetic Resinous Polymer Latex A was prepared from a commercial styrenated alkyd resin admixed with polyethylacrylate and containing phthalate esters which is sold at 30 to 40% solids under the trademark "A–247H," and modified herein by dilution with water to 15% solids.

Alkali-soluble resin

This resin was prepared by dissolving 100 parts by weight of a natural synthetic resin (commercial rosin/maleic anhydride modified with glycols sold under the trademark "SR–83") in 540 parts by weight of water heated to 70° C. to which was added 25 parts by weight of 26% aqueous solution of ammonium hydroxide. The mixture was stirred until the resin dissolved, and then adjusted with water to 15 wt. percent solids.

A polish composition was formulated containing the following components in the amounts indicated:

| Component: | Parts by weight |
|---|---|
| Base polymer A at 15 wt. percent solids | 25 |
| Synthetic resinous polymer A at 15 wt. percent solids | 60 |
| Alkali soluble resin at 15 wt. percent solids | 15 |
| Tributyl phosphate (commercially sold under the trademark "KP–140") | 0.5 |
| Diethylene-glycol monomethyl ether (commercial "Carbitol") | 2.0 |
| 1% fluorocarbon leveling agent (commercially sold as "FC–128") | 1.0 |
| pH | <8.5 |

The polish composition was then evaluated in accordance with the tests described above, and the results were as follows:

TEST

| Gloss: | Result |
|---|---|
| Single coat | Very Good (VG). |
| Double coat | Excellent (E). |
| Recoatability (1 hr.) | Excellent (E). |
| Waterspotting: | |
| 2 hr. | Slight (Sl.). |
| 24 hr. | None. |
| Leveling | Fair (F.). |
| Removability (strokes) | 86. |
| Haze | None. |
| Powdering | None. |
| Drag (recoat) | None. |
| Heel-mark resistance | Very Good (VG). |

EXAMPLES 2 TO 10

Base polymer B

A 15 percent dispersion was prepared from base polymer B which had chemically combined therein, by weight, 74 percent ethylene, 8.7% sodium methacrylate, 8.2 percent methacrylic acid, 9.8% methacrylamide and 0.1% methyl methacrylate. This base polymer was obtained by a process such as described in Example 1 for the base polymer A.

The Synthetic Resinous Polymer A latex of Example 1 was again prepared.

Synthetic resinous polymeric component B

This component was prepared from a commercial latex of a styrene/acrylic copolymer modified with acrylonitrile and methacrylate. This latex is sold at 36 to 40 wt. percent solids under the trademark "Ubatol U–3400." This commercial latex was modified for formulation to 15 wt. percent solids by dilution with water.

Synthetic resinous polymer component C

This component was prepared from a commercial polystyrene latex containing polystyrene of a molecular weight of 150,000. This commercial latex contains 36 to 40 wt. percent solids, and is sold commercially as "Ubatol UL–2001." This commercial latex was modified for formulation to 15 wt. percent solids by dilution with water.

Synthetic resinous polymeric component D

This component was prepared from a commercial latex containing approximately 85±5 wt. percent polyethyl acrylate, approximately 10±5 wt. percent polystyrene and 3±2 wt. percent emulsifier. This latex is sold commercially as "Ubatol U–3050" at 36 to 40 wt. percent solids. This latex was adapted for formulation by dilution with water to 15 wt. percent solids.

The alkali-soluble resin of Example 1 was again prepared in the manner indicated in Example 1.

A series of polish compositions at a pH 9.8–10.3 was prepared containing the indicated components in the amounts (parts by weight) specified in Table I below.

TABLE I

| Component | Example | | | | | | | | | |
|---|---|---|---|---|---|---|---|---|---|---|
| | 2 | 3 | 4 | 5 | 6 | 7 | 8 | 9 | 10 | 11 |
| Base polymer B at 15 wt. percent solids | 40 | 25 | 25 | 25 | 25 | 60 | 60 | 50 | 50 | 80 |
| Synthetic resinous polymeric component A at 15 wt. percent solids | | | | | 60 | | | | 40 | |
| Synthetic resinous polymeric component B at 15 wt. percent solids | 60 | 75 | | 60 | | 25 | | | | |
| Synthetic resinous polymeric component C at 15 wt. percent solids | | | 50 | | | | 25 | 25 | | 10 |
| Synthetic resinous polymeric component D at 15 wt. percent solids | | | 25 | | | | | 25 | | 10 |
| Alkali soluble resin at 15 wt. percent solids | | | | 15 | 15 | 15 | 15 | | 10 | |
| Dibutyl phosphate | | | | 0.7 | | | | 0.5 | | |
| Diethylene-glycol monomethyl ester, "Carbetol" | 2.0 | 2.0 | 0.5 | 2.0 | 2.0 | 1.0 | 0.3 | 1.8 | 2.0 | 2.0 |
| 1% fluorocarbon leveling agent (commercial "FC-128") | 1.0 | 1.0 | 1.0 | 1.0 | 1.0 | 1.0 | 1.0 | 1.0 | 1.0 | 1.0 |
| 1-octanol | 0.2 | 0.2 | | | | 0.1 | 0.1 | | | 0.2 |
| Tributoxyethyl phosphate (commercial KP-140) | 0.8 | 0.5 | 1.0 | 0.5 | 0.5 | 0.4 | 0.4 | 0.7 | 0.5 | 0.8 |

A series of tests as described above were made on the polish compositions of Examples 2 to 11, and the results are given in Table II below.

TABLE II.—POLISH

| Test | Polish composition of Example | | | | | | | | | |
|---|---|---|---|---|---|---|---|---|---|---|
| | 2 | 3 | 4 | 5 | 6 | 7 | 8 | 9 | 10 | 11 |
| Gloss: | | | | | | | | | | |
| Single coat | VG | VG | G | G | VG | E | E | E | E | E |
| Double coat | E | E | E | E | E | E | E | E | E | E |
| Recoatability (1 hr.) | E | E | E | E | E | E | E | E | E | E |
| Drag (recoat.) | N | N | N | N | N | N | V. Sl. | N | N | V. Sl. |
| Waterspotting: | | | | | | | | | | |
| 2 hrs | N | N | N | N | N | V. Sl. | Sl. | N | N | N |
| 24 hrs | N | N | N | N | N | N | N | N | N | N |
| Leveling | G | G | F–G | G | F–G | G | G | G | G | G |
| Removability: Strokes/Rating | 76/VG | 81/VG | 70/VG | 80/VG | 83/VG | 115/G | 44/E | 148/G | 79/VG | 96/VG |
| Haze | N | N | N | N | N | V. Sl. | V. Sl. | V. Sl. | N | V. Sl. |
| Powdering | N | N | N | N | N | N | N | N | N | N |
| Heel-mark resistance | E | G | E | E | E | E | G | G | G | G |
| Slip resistance [1] | 0.5 | 0.65 | 0.54 | 0.57 | 0.55 | | | | | |

[1] Control: GSA No. 1=0.45; "Contrast"=0.42.

E—Excellent, VG—Very Good, G—Good, F—Fair, V. Sl.—Very Slight, Sl.—Slight, P—Poor, N—None or No.

Although the invention has been described with reference to specific materals, embodiments and details, various modifications and changes, within the scope of the invention, will be apparent to one skilled in the art and are contemplated to be embraced within the invention.

What is claimed is:

1. A water-based polish composition comprising a continuous aqueous phase having dispersed therein a base polymer and a synthetic resinous polymeric material; said base polymer being a polymerization product having chemically combined therein 70 to 80 wt. percent ethylene, 5 to 12 wt. percent of an alkali metal acrylate selected from the group consisting of alkali metal acrylates and alkali metal methacrylates, 5 to 12 wt. percent of an acid selected from the group consisting of acrylic acid and methacrylic acid, 5 to 12 wt. percent of an amide selected from the group consisting of acrylamide and methacrylamide, and 0 to 5 wt. percent of an ester selected from the group consisting of acrylic and methacrylic acid esters of monohydric alcohols having from one to four carbon atoms; and said synthetic resinous material being a polymerization product of monomer units derived from members of the group consisting of styrene, the methacrylic acid esters of monohydric alcohols containing from one to eight carbon atoms and the acrylic acid esters of said monohydric alcohols.

2. The polish composition of claim 1 wherein said synthetic resinous material is a styrene resinous material selected from the group consisting of homopolymers of styrene and copolymers of styrene with comonomers selected from the group consisting of methacrylic acid, acrylic acid, methacrylic and acrylic acid esters of monohydric alcohols containing from one to eight carbon atoms, acrylonitrile, acrylamide and itaconic acid.

3. The polish composition of claim 1 wherein said continuous phase contains from 10 to 25 wt. percent of solids comprised of said base polymer and said synthetic resinous material.

4. The polish composition of claim 3 wherein the proportions of said base polymer to said synthetic resinous materials is respectively in the range of 25:75 to 75:25 part by weight.

5. The polish composition of claim 1 wherein said aqueous phase includes a dispersion therein of an alkali-soluble material selected from the group consisting of rosin, shellac, casein, phenolformaldehyde resins, styrene/maleic copolymers, condensation products of reactants comprising rosin and maleic anhydride, and condensation products of reactants comprising rosin and fumaric acid.

6. The polish composition of claim 5 wherein the proportions of said base polymer to said synthetic resinous material is, respectively, in the range of 25:75 to 75:25 part by weight, and said alkali-soluble material comprises 10 to 90 weight percent of said base polymer.

7. The polish composition of claim 1 wherein said base polymer comprises a polymerization product having chemically combined therein 72 to 76 wt. percent ethylene, 7.3 to 8.8 wt. percent sodium methacrylate, 7.6 to 9.9 wt. percent methacrylic acid, 6.7 to 10.2 wt. percent methacrylamide and 0 to 4.4 wt. percent of a methacrylic acid ester of monohydric alcohols having from one to four carbon atoms.

8. The polish composition of claim 7 wherein the proportion of said base polymer to said synthetic resinous material is, respectively, in the range of 25:75 to 60:40 parts by weight.

9. The polish composition of claim 7 wherein said aqueous phase includes a dispersion therein of an alkali-soluble material selected from the group consisting of rosin, shellac, casein, copolymers of styrene and maleic anhydride, phenol-formaldehyde resins, condensation products of reactants comprising rosin and maleic anhydride, and rosin and fumaric acid.

10. The polish composition of claim 7 wherein the proportion of said base polymer to said synthetic resinous material is, respectively, in the range of 25:75 to 60:40 parts by weight and said alkali-soluble material comprises 10 to 90 weight percent of said base polymer.

(References on following page)

References Cited

UNITED STATES PATENTS

| | | | |
|---|---|---|---|
| 2,957,847 | 10/1960 | Sayler et al. | 260—897 |
| 2,964,487 | 12/1960 | Chapman et al. | 260—897 |
| 3,035,011 | 5/1962 | Bartle et al. | 260—897 |
| 3,156,666 | 11/1964 | Pruett | 260—897 |
| 3,297,784 | 1/1967 | Snedeker et al. | 260—897 |
| 2,791,600 | 5/1957 | Schwaegerle | 260—29.6 |
| 3,350,329 | 10/1967 | Scholl | 260—8 |
| 2,928,797 | 3/1960 | Brunson et al. | 260—29.6 |

FOREIGN PATENTS 1,425,907  12/1965  France.

WILLIAM H. SHORT, *Primary Examiner.*

E. M. WOODBERRY, *Assistant Examiner.*

U.S. Cl. X.R.

260—27, 29.6, 844, 886, 897